July 17, 1962 W. B. TRAYNER 3,045,226

THEFT DETECTION SYSTEM FOR TELEVISION RECEIVERS OR THE LIKE

Filed Aug. 10, 1959 2 Sheets-Sheet 1

Willard B. Trayner
INVENTOR.

BY Clarence A. O'Brien
and Harvey B. Jacobson
Attorneys

THEFT DETECTION SYSTEM FOR TELEVISION RECEIVERS OR THE LIKE

Filed Aug. 10, 1959 2 Sheets-Sheet 2

Willard B. Trayner
INVENTOR.

BY Clarence A. O'Brien
and Harvey B. Jacobson
Attorneys

United States Patent Office 3,045,226
Patented July 17, 1962

3,045,226

THEFT DETECTION SYSTEM FOR TELEVISION RECEIVERS OR THE LIKE

Willard B. Trayner, 1133 Winchester Road, Lexington, Ky., assignor of fifty percent to Russell Lutes, Lexington, Ky.

Filed Aug. 10, 1959, Ser. No. 832,658
11 Claims. (Cl. 340—280)

This invention relates to alarm systems and more particularly to an alarm system to indicate attempted theft of television receivers or the like in motels, hotels or other establishments using a number of television receivers or other such electrical devices.

An object of the invention is to provide an alarm system for a plurality of electrical appliances such as television receivers, the alarm system adapted to yield an audible alert and a visible signal to indicate the particular television receiver which is being tampered with.

Briefly, a system in accordance with the invention includes a small box provided with a cover through which the power cable to the device extends and containing a switch which is held normally open by the cover. If the cover is removed in an attempt to disconnect the electrical device without unplugging the line cord, the normally open switch closes and breaks a relay circuit enabling the relay to energize a signal light and preferably, but not necessarily, a buzzer or some other audible signal mechanism. Of course, unplugging the line cord also energizes the signal light or mechanism. It will therefore be apparent that a more foolproof theft detection system is provided.

Furthermore, the signal and control portions of the system operate on low voltage, making the installation considerably easier both as to actual installation and as to materials.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
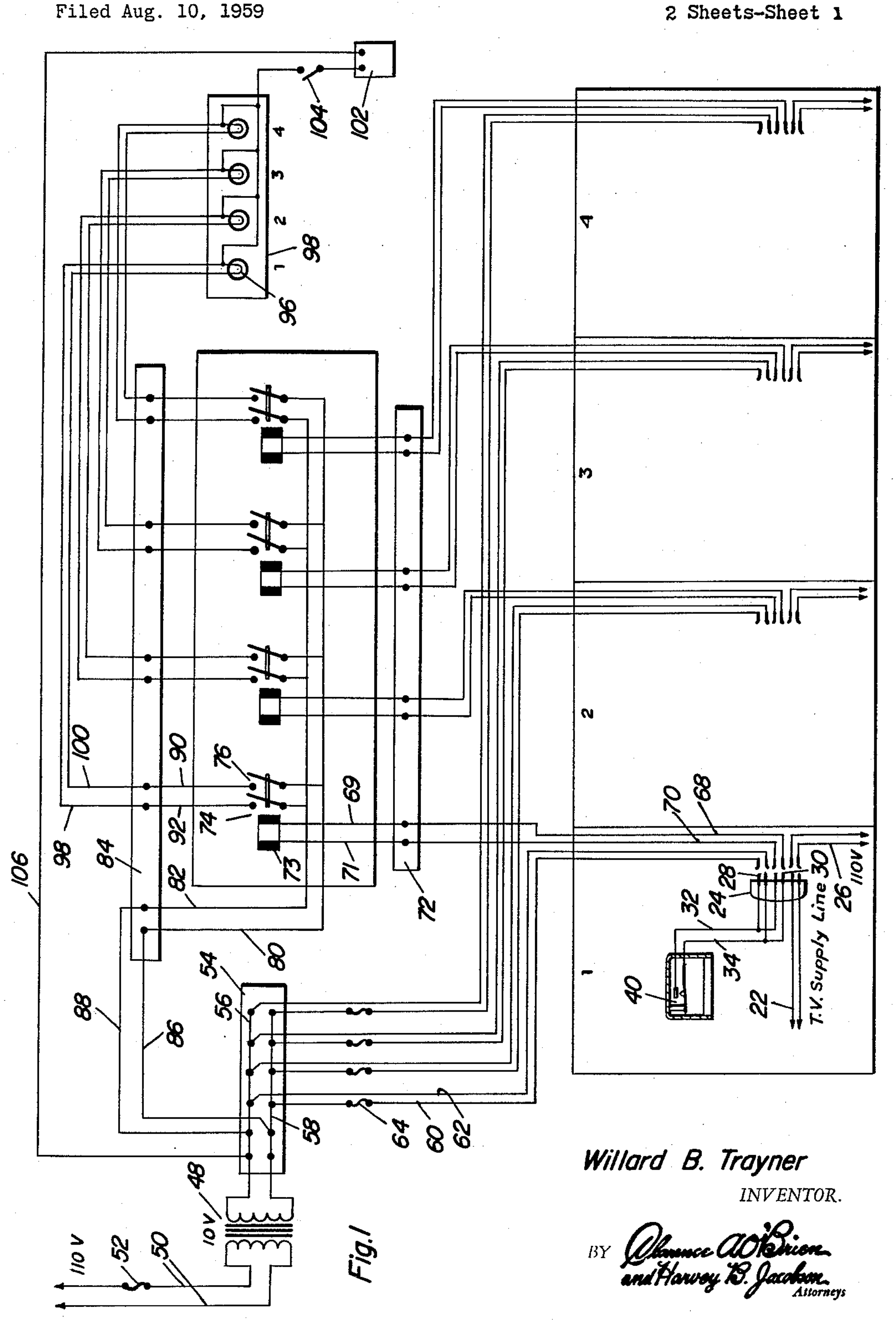
FIGURE 1 is a diagrammatic view showing the wiring of a typical system for four rooms, it being understood that a greater or smaller number of rooms may be equipped with the system.
Figure 2:
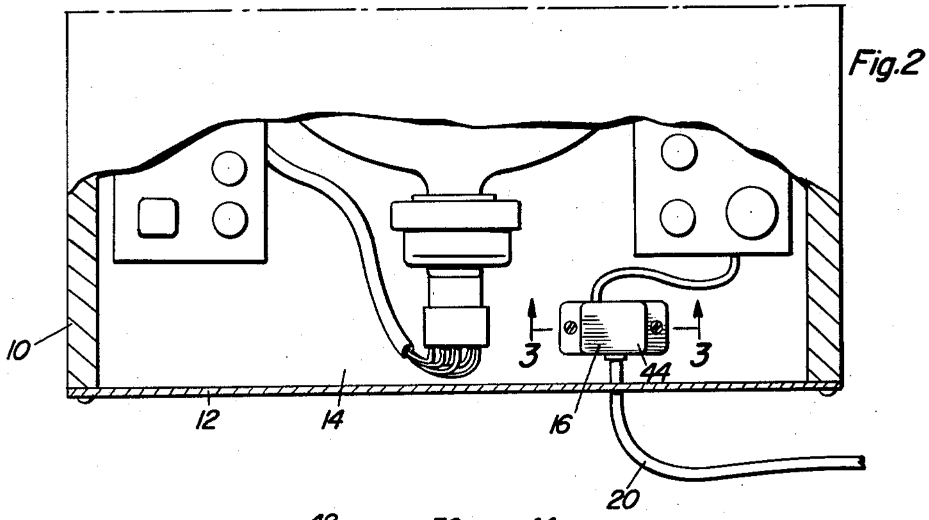
FIGURE 2 is a largely diagrammatic partially elevational and partially sectional view showing a conventional television receiver provided wtih a control box in accordance with the invention.
Figure 3:
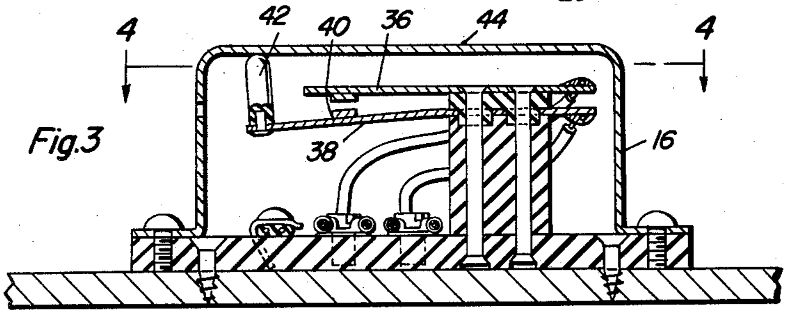
FIGURE 3 is an enlarged sectional view taken on the line 3—3 of FIGURE 2.
Figure 4:
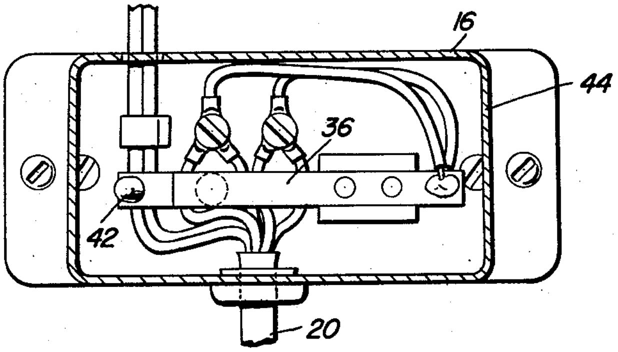
FIGURE 4 is a sectional view taken on the line 4—4 of FIGURE 3.

In the accompanying drawings a fragmentary part of a television receiver or other such electrical device 10 is illustrated in FIGURES 2 and 3. The receiver has a back 12 and a chassis 14 on which control box 16 is mounted. It is to be understood that the control box may be mounted elsewhere within the television receiver, but it is preferably contained within the receiver casing so that it cannot be inadvertently disturbed, it requiring a conscious effort to first remove the back panel of the television receiver. The television receiver 10 is in room #1, it being understood that identical television receivers equipped with controls identical to control 16 are provided in the other rooms shown in FIGURE 1.

A single multi-conductor wire 20 extends into control box or enclosure 16, and as shown in FIGURE 1, a conventional 110-volt A.C. supply 22 for the television receiver contained within the wire 20. A special electrical connector assembly is provided including a multi-prong plug 24 attached at one end of conductor 20 and adapted to be inserted in a multi-position socket receptacle having a number of contacts, two of which are operatively connected with a 110 v. A.C. line 26 that connects with television receiver line 22.

The same plug 24 has two additional sets 28 and 30 of prongs, and there are four conductors extending therefrom and operatively connected with cross wired conductors 32 and 34 which are also housed in the multi-conductor wire 20. These are secured to arms 36 and 38 of a short-circuiting switch 40 contained in control 16. The contacts of the switch 40 are held in a normally open position by means of a bumper 42 at the end of arm 38 which is in engagement with cover 44 of the control 16. When the cover is removed only a fraction of an inch (FIG. 3) it is evident that the inherent resilience of conductor switch arm 38 will move the switch arm to such position that switch 40 becomes closed in order to short circuit a power supply of control current. As will subsequently be seen, this will initiate a signal circuit without affecting the power supply of operating current for the television receiver. As will further be seen, removal of plug 24 from its socket will also initiate a signal.

Considering more particularly the television receiver burglar alarm system, step-down transformer 48 provides a low voltage source for both location indicating lamps 96 and control current for relay coil 73. This step-down transformer is operatively connected with a 110 v. A.C. source by way of conductors 50, one of which has a fuse 52 therein. The low voltage output side of transformer 48 is connected with alarm panel 54 containing bus bars 56 and 58 to which low voltage conductors 60 and 62 are secured for conducting control current. These conductors terminate in socket positions of the socket within which the pair of prongs 28 engage. A low amperage fuse 64, for example a 3-amp. fuse, is in one of the low voltage lines 60 or 62. Inasmuch as conductors 32 and 34 are cross wired, switch 40 opens the low voltage circuit, but control current is capable of flowing through contact 30 and low voltage conductors 68 and 70 which ultimately terminate in socket positions with which the pair 30 of prongs are engaged. Conductors 68 and 70 extend to a coil supply panel 72 from which conductors 69 and 71 extend, and these are operatively engaged with the coil 73 of relay 74. Relay 74 remains open while coil 73 is energized, and the switch section 76 of relay 74 closes immediately upon cessation of current in relay coil 73. It is now evident that if plug 24 is disconnected, control current will not flow to the coil 73 of relay 74 with the consequence that relay 74 has its switch section 76 closed so as to supply lamp operating current to the lamps 96. It is equally apparent that should switch 40 be closed, a short circuit will develop thereby blowing fuse 64 and this will also discontinue the supply of control current in relay coil 73, causing the relay switch section 76 to close.

The relay switch section 76 is connected to the source of current by conductors 80 and 82 which extend to a signal light panel 84 and to alarm panel 54 via conductors 86 and 88. Therefore, the switch section 76 has an available low voltage source of potential so that when the switch section 76 is closed, lamp operating current may flow through conductors 90 and 92 connected with switch section 76, a contact position on signal light panel 84 and to a location indicating signal lamp 96 on a signal lamp panel 98 which may be remotely located, for instance at the service desk in a motel or hotel. Conductors 99 and 100 extending from the taps on signal light panel 84 energized by conductors 90 and 92, are used to energize lamp 96 indicating that there is someone tampering with the television receiver at some remotely located station as for example in room #1 of the hotel or motel identified by the lamp.

As an optional piece of equipment, there is an audible signal, for example a buzzer 102 connected in parallel with signal lamp 96 and all other signal lamps like it so as to provide an alerting signal in response to station identification by one or more lamps 96. Control switch 104 for deactivating the buzzer is connected in series with the buzzer. It will be observed that said buzzer 102 is connected in parallel with signal lamp 96, and the buzzer requires only a single line 106 extending therefrom to one side of the output section of transformer 48.

It is now clear from further inspection of FIGURE 1 that each room is equipped with a signal initiating control in the television receiver identical to the control which was described in detail. Further, there is a circuit peculiar to each television receiver control, and it includes circuit wiring the same as that previously described in connection with the equipment associated with the television receiver in room #1. Consequently, a detailed description of each of the circuits within the framework of the alarm system is deemed unnecessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A theft detection system for electrical devices comprising, alarm circuit means, enclosure means mounted within the electrical device, power plug means operatively connected to the enclosure means and the electrical device, plug receiving receptacle means operatively receiving and connecting the plug means to a supply source of power and the alarm circuit means and control means operatively connected to the receptacle means and alarm circuit means and responsive to either tampering with the enclosure means or removal of the plug means from the receiving receptacle means for energizing the alarm circuit means.

2. The combination of claim 1, wherein said enclosure means comprises, casing means operatively connected to the plug means by a single cable, short circuiting switch means enclosed within the casing means and connected to a first pair of conductors in said single cable, a second pair of conductors in said cable extending through the casing means for connecting the plug means to the device to supply power thereto, said switch means being operative to close in response to removal of the casing means exposing the conductors received therewithin.

3. The combination of claim 2, wherein said plug means connects said first pair of conductors to the supply source of power and the other pair of conductors to both the alarm circuit means and the control means in parallel.

4. The combination of claim 3, wherein said alarm circuit means includes a first normally open, switch-controlled, signal indicating portion and a second fuse-controlled portion in parallel therewith connected to said receptacle means and operative in response to closing of the switch means to short circuit and open.

5. The combination of claim 4, wherein said control means comprises normally energized relay means connected in parallel to said receptacle means and thereby operative to hold the first portion of the alarm circuit means open.

6. The combination of claim 1, wherein said receptacle means includes means connected to the alarm circuit means, control means and supply source of power and operative upon reception of the plug means to energize the control means and thereby hold the alarm circuit means open and provide power for the appliance.

7. A theft detection system for an electrical device, comprising, a single line cord, disconnectible means operatively connecting the line cord to a source of current, enclosed means operatively mounted in the electrical device through which the line cord is operatively connected to the electrical device, and alarm circuit means operatively connected to the disconnectible means and operative to issue an alarm signal in response to either disconnection of the disconnectible means or disturbance of the enclosed means.

8. A theft detection system for an electrically powered device comprising an electrically driven alarm, an electromagnetic switch connected in circuit with said alarm operable when deenergized to energize said alarm, a first movable contact bar indirectly connected to a source of electric current in parallel with said alarm and said switch, two male connector prongs connected to said bar, a second stationary contact bar held in spaced relation with respect to said first contact bar, two male connector prongs connected to said second contact bar, an enclosure for said contact bars mounted in said electrically powered device and cooperating therewith to effect contact between said contact bars upon removal of the enclosure, a pair of male connector prongs connected to said device for powering thereof, all of said male connector prongs being mounted on a single plug in spaced alignment with pairs of female connectors on a single receptacle, one of said pairs of female connectors being connected to said electric current source, said alarm and said switch, another pair of female connectors being directly connected to said electric current source alone and a third pair of said female connectors being connected to the electromagnet of said electromagnetic switch.

9. In a theft detection system for a plurality of electrical appliances, a plurality of remotely spaced appliance stations, each of which comprises an electrical connector assembly having a receptacle, a plug and a single cable connected to said plug, circuit means for connecting each electrical appliance to a source of power through said electrical connector assembly, a plurality of location indicators, means including a cable for connecting each receptacle to a location indicator and a source of power, an enclosure adapted to be mounted on an appliance at each appliance station to which said single cable is connected, an alarm connected in parallel with each of said location indicators, a relay, means for supplying power from said source of power to each of said location indicators including a switch held closed by said relay, conductors connected to said plug for connecting said relay to the source of power through the receptacle and said cable connected thereto, and circuit shorting means mounted in said enclosure and held open by mounting of the enclosure on an appliance including conductor means forming part of said single cable connected to the enclosure for shorting the connection of the source of power to the relay upon removal of the enclosure from an appliance on which it is mounted.

10. A theft detection system for electrical appliances located at a plurality of remotely spaced stations comprising location indicating means rendered operative to identify one or more of said remotely spaced stations, alarm means operatively connected to said location indicating means for producing an alerting signal in response to station identification by said location indicating means, power receptacle means mounted at each of said remotely spaced stations to establish an available power source of operating energy for an electrical appliance and control energy for said location indicating means, removable connector means received within each power receptacle means for establishing a supply of said operating energy to said electrical appliances and said control energy to the location indicating means to prevent station identification thereby, concealing enclosure means operatively connected to said removable connector means for conducting said operating energy to the electrical appliance and power disabling means mounted within the enclosure means and operative through the removable connector means to interrupt supply of control energy by said power source available at the power receptacle means, in response to exposure by removal of the enclosure means.

11. The combination of claim 10 including relay means operatively connected to the power receptacle means for supply of control energy thereto for rendering the location indicating means inoperative and fuse means operatively connected to said power receptacle means for disconnecting said supply of control energy from the power source in response to short circuiting thereof by the power disabling means upon removal of the enclosure means, without affecting the supply of operating energy.

References Cited in the file of this patent

UNITED STATES PATENTS

| | | |
|---|---|---|
| 1,290,644 | Nelson | Jan. 7, 1919 |
| 1,758,523 | Kertz | May 13, 1930 |
| 2,463,339 | Wetzel et al. | Mar. 1, 1949 |
| 2,643,372 | Stelter | June 23, 1953 |
| 2,754,498 | Lavelle | July 10, 1956 |
| 2,799,852 | Barnes | July 16, 1957 |
| 2,912,600 | Isenberg | Nov. 10, 1959 |
| 2,923,928 | McLaughlin | Feb. 2, 1960 |